(12) United States Patent
Yokota

(10) Patent No.: US 7,442,293 B2
(45) Date of Patent: Oct. 28, 2008

(54) OIL/WATER SEPARATION APPARATUS FOR OIL-CONTAINING MIXTURE

(75) Inventor: Kenichi Yokota, Shiga (JP)

(73) Assignee: Jyonan Electric Industrial Corporation Limited, Kyoto (JP)

( * ) Notice: Subject to any disclaimer, the term of this patent is extended or adjusted under 35 U.S.C. 154(b) by 502 days.

(21) Appl. No.: 11/034,916

(22) Filed: Jan. 14, 2005

(65) Prior Publication Data

US 2006/0157397 A1    Jul. 20, 2006

(51) Int. Cl.
*C02F 1/28* (2006.01)
(52) U.S. Cl. .......... 210/120; 210/266; 210/283; 210/284; 210/289; 210/290; 210/317; 210/416.1; 210/492; 210/497.1; 210/502.1
(58) Field of Classification Search ........... 210/120, 210/266, 283, 284, 289–291, 317, 416.1, 210/492, 502.1, 665, 667, 690–694, DIG. 5, 210/497.1
See application file for complete search history.

(56) References Cited

U.S. PATENT DOCUMENTS 4,217,210 A * 8/1980 Heidenreich ............ 210/667
6,180,010 B1 * 1/2001 Alper .................... 210/680

FOREIGN PATENT DOCUMENTS

JP       03242206 A * 10/1991  ........... 210/266

\* cited by examiner

*Primary Examiner*—Matthew O Savage
(74) *Attorney, Agent, or Firm*—Cheng Law Group PLLC

(57) ABSTRACT

Oil adsorbent layers 4 and packed layers 5 are alternately laminated inside a treatment vessel 2, the oil adsorbent layers 4 comprise ten laminated flat sheets 4a composed of polypropylene, and gelled aluminum hydroxide 15 is evenly applied over the surface of each of these sheets 4a on the laminated side. These flat sheets 4a are lipophilic and hydrophobic.

19 Claims, 10 Drawing Sheets large quantity of air small quantity of air

OIL/WATER SEPARATION APPARATUS FOR OIL-CONTAINING MIXTURE

BACKGROUND OF THE INVENTION

The present invention relates to an oil/water separation apparatus for removing oil from an oil-containing mixture. "Oil-containing mixture" as used here refers to oil-water mixtures, oil mixed into water, water mixed into oil, emulsified water discharged from a compressor or the like, and so on.

Drain waste liquids are discharged from the many compressors that are used in ordinary factories. These drain waste liquids mainly consist of emulsified, cloudy liquids, which are produced when the lubricating oil mists that drift throughout a device bond with water in the air. Once admixed, water and oil are not easily separated. These drain waste liquids, which contain 50 to 1000 ppm oil, need to have the oil removed before being released into the water system, for the sake of environmental protection.

Common types of apparatus for removing the oil from such oil-containing mixture include filtration membrane types, specific gravity separation types, adsorption types, and electrolysis types.

A filtration membrane type of apparatus makes use of an ultrafiltration membrane or a reverse osmosis membrane.

A specific gravity separation type of apparatus separates the oil from an oil-containing mixture by means of the difference in the specific gravity between oil and water. This type of apparatus is disclosed in Japanese Patent Application 2003-301776, which is a drain treatment apparatus comprising a separation unit and an evaporation unit that is connected to the separation unit. The separation unit utilizes a specific gravity differential to separate the oil in a drain waste liquid from an air compressor, and the evaporation unit takes the drain waste liquid that has been treated in the separation unit and evaporates it inside an exhaust duct used for the cooling air of the air compressor.

An adsorption type of apparatus has been disclosed in JP2004-154630 (A), in which a vessel is packed with an FRP powder, and oil is removed by being adsorbed to the surface of this FRP powder.

An electrolysis type of apparatus is disclosed in Japanese Patent 2,691,119, in which excess metal ions are eluted from an electrode, thereby producing a floc of aluminum hydroxide or the like, the cohesive strength of this aluminum hydroxide is utilized to produce clumps of colloidal oil, and these are recovered by gravitational separation or adsorptive separation, thereby removing the oil.

In the prior art discussed above, however, with a filtration membrane type the membrane itself is expensive, which drives up the running cost of the apparatus. Furthermore, because the pores in the filtration membrane are so small, they tend to become clogged, requiring washing or other such treatment, which is a drawback in that the treatment efficiency is low.

A drawback to a specific gravity separation type of apparatus is that the state of separation can be uncertain because of the small difference in specific gravity between water and oil. Consequently, a multi-step treatment is necessary, but this results in a larger-scale apparatus configuration, and if the oil is in the form of an emulsion, some of the oil may not be separated, among other drawbacks.

An advantage to an adsorption type of apparatus is that if the oil is dispersed in the form of relatively large particles in water, the oil can be removed at high precision, and treatment efficiency is high. Nevertheless, when the oil is in the form of a fine colloidal emulsion, the percentage of oil removed decreases and treatment performance is low.

With an electrolytic apparatus, the separated aluminum hydroxide floc (hydrous sludge) has to be treated as industrial waste, the apparatus configuration becomes larger, and the cost is higher. Also, when metal ions are used in a large quantity, the positive electrode is consumed more quickly, shortening the service life of the electrode, and electrical power consumption also rises.

There are no restrictions on the oil-containing mixture to be treated here, which can be any liquid containing waste oil from some kind of machinery. In particular, though, the waste oily water from a compressor drain contains oil in a concentration of 150 to 500 ppm, and the particle size of this oil can be anywhere from about 0.001 to 100 μm. Accordingly, oil with a small particle size, and particularly colloidal oil, can pass right through the oil adsorbent layers of a conventional apparatus, making it difficult to thoroughly separate all of the oil.

SUMMARY OF THE INVENTION

The present invention was conceived in order to solve the above problems, and it is an object thereof to provide an apparatus for separating oil from an oil-containing mixture, with which oil can be removed efficiently from an oil-containing mixture, which can be installed in areas with limited space, and which can operate at a low running cost.

To achieve the stated object, the apparatus for separating oil from an oil-containing mixture of the present invention comprises a treatment vessel in which an inlet port for an oil-containing mixture and an outlet port for treated water produced by oil separation treatment are provided across from one another, wherein the interior of the treatment vessel is provided with an oil separation layer produced by alternately laminating adsorbent layers, which fit snugly against the inner walls of the treatment vessel, and packed layers, in which the spaces between powder particles are filled with a coagulant, and a specific space is maintained within the treatment vessel between the inlet port and the uppermost surface of this oil separation layer.

The result of the above constitution is that an oil-containing mixture flows through the coagulant between the particles in the packed layers and through the oil adsorbent layers, and the oil in the oil-containing mixture, and particularly any colloidal oil, clumps up in the packed layers and is separated by adsorption in the oil adsorbent layers. The oil in the oil-containing mixture can therefore be removed at high precision. Also, since the oil-containing mixture can be made to flow through the packed layers and oil adsorbent layers more quickly, the oil-containing mixture can be treated faster.

It is preferable for this oil/water separation apparatus to be constituted such that the oil adsorbent layers are produced by the lamination of a plurality of flat sheets.

Further, it is preferable in this constitution if the coagulant adheres evenly over the surface of every one of the plurality of flat sheets, or at intervals of every few sheets, and if this coagulant is gelled aluminum hydroxide or ferric hydroxide.

It is also preferable that a communicating pipe is connected to the outlet port of the treatment vessel, this communicating pipe is provided in the height direction of the treatment vessel, and a treated water take-off port that opens outward is provided at a location corresponding to a specific height within the specific space in the communicating pipe.

The constitution may also be such that a buffer tank is provided directly above the treatment vessel, and the air pressure inside the buffer tank is adjusted so that the inside of this tank will be under micropressure.

In this case, it is preferable that chips that adsorb floating oil are added to the specific space, and these chips are composed of nonwoven cloth.

It is also preferable that the flat sheets are mesh sheets made of inorganic fiber or are organic macromolecular sheets that are lipophilic and hydrophobic, and the material thereof is selected from among polypropylene, polyethylene, polyester, cotton, rayon, and glass wool.

The size of the mesh openings in this oil adsorbent material is preferably 1 to 100 µm, which is suited to effectively adsorbing oil and allowing oil to flow through. In order for the coagulant treatment to proceed smoothly in the case of a hydrophobic fibrous polymer, it is preferable for the surface of this polymer to be subjected ahead of time to a hydrophilic treatment with a surfactant or the like. If the coagulant treatment is performed without a hydrophilic treatment being performed first, the liquid containing the coagulant will be repelled, preventing treatment.

It is also preferable that the powder is composed of activated carbon, zeolite, diatomaceous earth, activated clay, anthracite, bentonite, alumina, activated alumina, sand, vinyl chloride, polypropylene, or polyethylene, and that the particle size is from 0.1 to 3 mm.

Further, it is preferable that a slatted sheet is provided between the outlet port of the treatment vessel and the oil separation layer.

With the above constitution, when the oil-containing mixture flows a plurality of times through the coagulant between the particles in the packed layers and through the flat sheets that make up the oil adsorbent layers, the oil in the oil-containing mixture, and particularly any colloidal oil, clumps up in the packed layers and is separated by adsorption in the oil adsorbent layers, and this process is repeated continuously. Therefore, the oil in the oil-containing mixture can be removed at high precision. With a structure such as this, in which flat sheets are laminated in oil adsorbent layers, the high percentage of void results in a sparse structure, allowing the oil-containing mixture to pass through easily. Therefore, this structure is less prone to clogging with oil, and has a longer service life.

Also, since the zeta potential is higher than the mutual attraction (Van der Waals force) between small oil particles of 1 µm or less, these particles will not cohere naturally. However, the presence of gelled aluminum hydroxide or ferric hydroxide that adheres evenly over the surface of every one of the plurality of flat sheets, or at intervals of every few sheets, provides more opportunities for the neutralization of charges of zeta potential, so neutralization proceeds more efficiently and reliably, and emulsified oil particles that are 1 µm or less in size cohere and clump together in particles of about 10 to 100 µm, making adsorption possible. Therefore, unlike an untreated adsorption layer that can adsorb only large oil particles, the oil separation layer of this application is able to adsorb all the oil, resulting in higher performance.

By providing a treated water take-off port to the communicating pipe at a location corresponding to a specific height within the specific space, the level of the oil-containing mixture contained in the treatment vessel can be maintained at a specific height from the uppermost surface of the oil separation layer.

Also, with a constitution in which the inside of the buffer tank provided on top of the treatment vessel is under micropressure, the pressure when the drain waste liquid is pushed out along with air (7 kg/cm$^2$, for example) will not be directly exerted on the liquid surface above the oil separation layer in the treatment vessel, and a micropressure is instead exerted on the liquid surface through an air pressure regulating function, whose primary function is that of a relief valve for efficiently releasing air pressure, and whose secondary purpose is for the air inside the buffer tank to serve as a cushion. This eliminates the problems encountered when the drain waste liquid was made to flow through by the principle of natural falling.

Further, when chips composed of nonwoven cloth are added to a specific space between the inlet port and the uppermost surface of the oil separation layer, these chips will adsorb any floating oil, which allows oil to be removed more efficiently.

When the powder is composed of activated carbon, zeolite, diatomaceous earth, activated clay, anthracite, bentonite, alumina, activated alumina, sand, vinyl chloride, polypropylene, or polyethylene, and when the particle size is from 0.1 to 3 mm, since the powder is integrated by the coagulant in the packed layers, with the particles serving as nuclei, the oil-containing mixture is able to flow relatively easily and quickly through the coagulant between the particles, and even if the oil-containing mixture is introduced under pressure, the integrated state of the packed layers will not readily be disrupted. These packed layers allow colloidal oil with a particle size ranging from 0.001 to 1 µm to be absorbed and coagulated.

Also, when a slatted sheet is provided between the oil separation layer and the outlet port of the treatment vessel, this will ensure a space the height of the slatted sheet (between the oil separation layer and the outlet port of the treatment vessel), so treated water can be discharged from the outlet port more smoothly and without standing.

With the above constitution, the oil separation layer comprising the oil adsorbent layers and the packed layers laminated in a specific order is preferably constituted by an oil adsorbent material composed of nonwoven cloth and wound in a roll whose axis is the height direction of the treatment vessel.

With this constitution, a plurality of laminated oily water separation layers, each produced by laminating first the oil adsorbent layer and then the packed layer, may be laminated inside the treatment vessel.

Also, a layer composed of coagulant may be provided to the top layer portion of the oil adsorbent layer, and this coagulant is preferably gelled aluminum hydroxide or ferric hydroxide.

With an oil/water separation apparatus in which the oil adsorbent material is wound in a roll, the constitution in which a communicating pipe, a treated water take-off port, a buffer tank, and a slatted sheet are provided is the same as the constitution of the invention described above.

Further, the oil adsorbent material composed of nonwoven cloth is the same as the flat sheets, the material that makes up the powder can be the same as in the constitution of the invention described above, and the same action and effect will be achieved.

DESCRIPTION OF THE PREFERRED EMBODIMENTS

Figure 1:
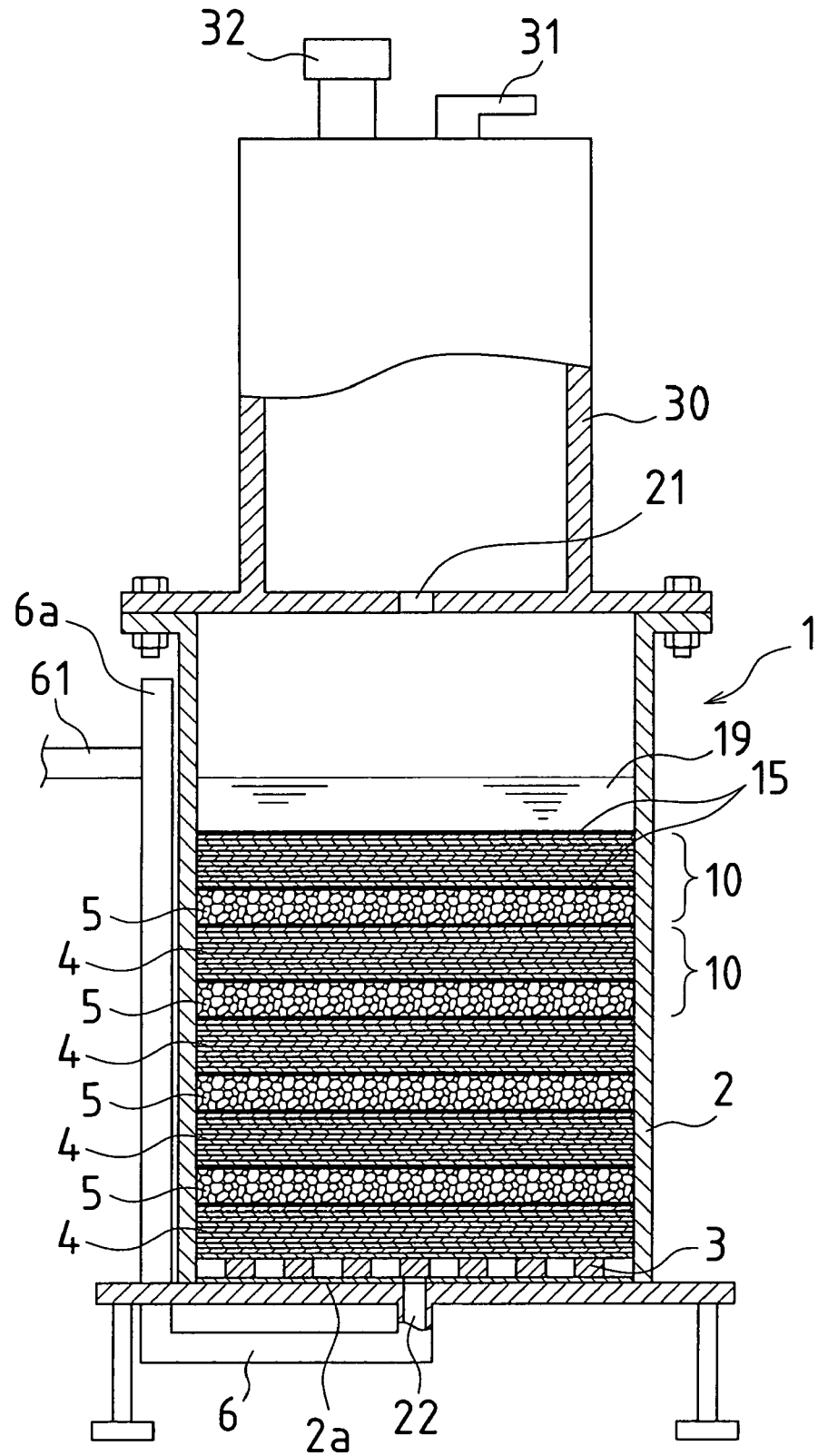
FIG. 1 is a vertical cross section of the main components in a first embodiment of the oil/water separation apparatus of the present invention.
Figure 2:
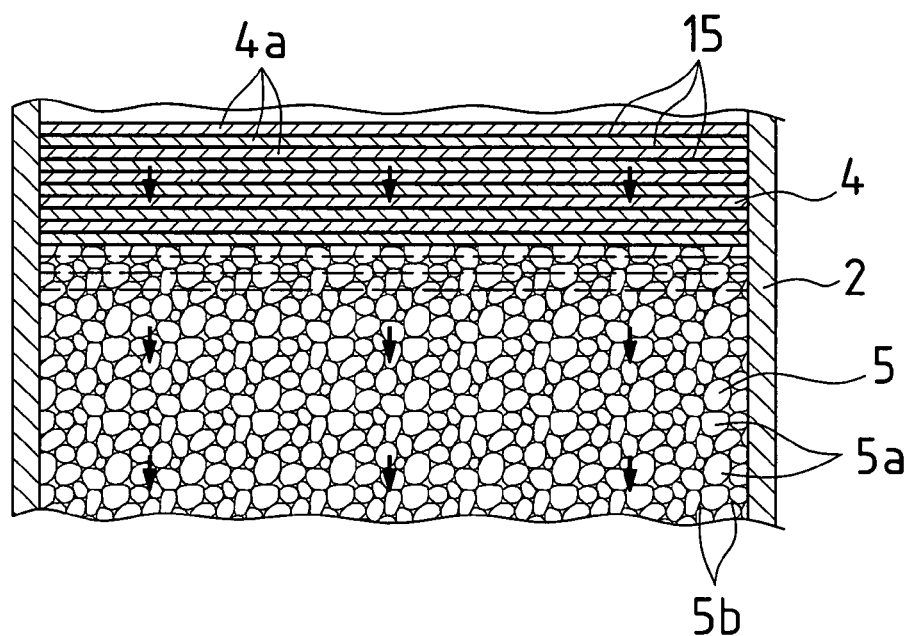
FIG. 2 is a vertical cross section of the oil separation layer in the first embodiment of the oil/water separation apparatus of the present invention.

The first embodiment of the present invention will be described through reference to the drawings. FIG. 1 is a vertical cross section of the main components in an embodiment of the oil/water separation apparatus of the present invention, and FIG. 2 is a vertical cross section of the oil separation layer thereof.

This oil/water separation apparatus 1 is provided with a slatted sheet 3 over the bottom 2a on the inside of a stainless steel treatment vessel 2 in which an inlet port 21 for an oil-containing mixture and an outlet port 22 for treated water that has undergone oil separation treatment are provided across from each other. Oil adsorbent layers 4 and packed layers 5 are alternately laminated over this slatted sheet 3. In this embodiment, there are five oil adsorbent layers 4 and four packed layers 5, with the uppermost layer being an oil adsorbent layer 4. As shown in FIG. 2, each of the oil adsorbent layers 4 comprises ten laminated flat sheets 4a composed of polypropylene (an organic macromolecular), and gelled aluminum hydroxide 15 adheres evenly over the surface of each of these sheets 4a on the laminated side. These flat sheets 4a are lipophilic and hydrophobic.

The oil-containing mixture will leak if there is any gap between these laminated sheets 4a and the side walls of the treatment vessel 2, so gaps are sealed with a silicone-based adhesive. In this case, every one of the flat sheets 4a may be sealed with the adhesive, or only every other layer may be sealed.

The packed layers 5 have a structure comprising a coagulant that fills the spaces between powder particles. Activated carbon 5a with a particle size of 0.1 to 3 mm is used as this powder, and gelled aluminum hydroxide 5b is used as the coagulant. This results in a structure in which the particles of activated carbon 5a serve as nuclei, which are integrated with the coagulant. The gelled aluminum hydroxide 15 adheres over each of these packed layers 5.

In the oil separation layer 10 structured as above, in this embodiment, the gelled aluminum hydroxide 15 also adheres evenly to the surface of each of the packed layers 5 on the laminated side.

A buffer tank 30 is provided directly above the treatment vessel 2, and communicates with the treatment vessel 2 via the inlet port 21. This buffer tank 30 is connected to an inflow pipe 31, and a drain waste liquid flows into the treatment vessel 2 along with air from a compressor (see FIG. 3) and through this inflow pipe 31. A relief valve 32 for allowing air to escape during this inflow is provided to the buffer tank 30. With this constitution, the inside of the buffer tank 30 is adjusted to be under micropressure so as to keep the level of the oil-containing mixture from rising. The buffer tank 30 also serves as a buffer vessel for accommodating a rise in liquid level in the event that clogging inside the treatment vessel should cause the level of the oil-containing mixture to rise. Further, chips (not shown) that adsorb floating oil are added to a specific space between the inlet port and the uppermost surface of the oil adsorbent layer, and these chips are composed of polypropylene nonwoven cloth. Thus adding chips to the space at the top of the treatment vessel eliminates the need for separately providing a treatment layer for taking up floating oil, and eliminates the need for such pretreatment.

A communicating pipe 6 is connected to the outlet port 22 of the treatment vessel 2, this communicating pipe 6 is provided in the height direction of the treatment vessel 2, and a treated water take-off port 61 that opens outward is provided at a location corresponding to a specific height within the specific space in the communicating pipe 6. The uppermost end of the communicating pipe 6 is provided with an air bleed hole 6a, which is used for anti-siphoning. When the communicating pipe 6 thus extends upward from the bottom, the oil-containing mixture flows evenly into the treatment vessel 2, and the oil-containing mixture can be kept at the same height as the treated water take-off port 61, so the oil adsorbent layers 4 can be immersed in the oil-containing mixture at all times, which ensures liquid permeability even though the flat sheets are hydrophobic.

Figure 3:
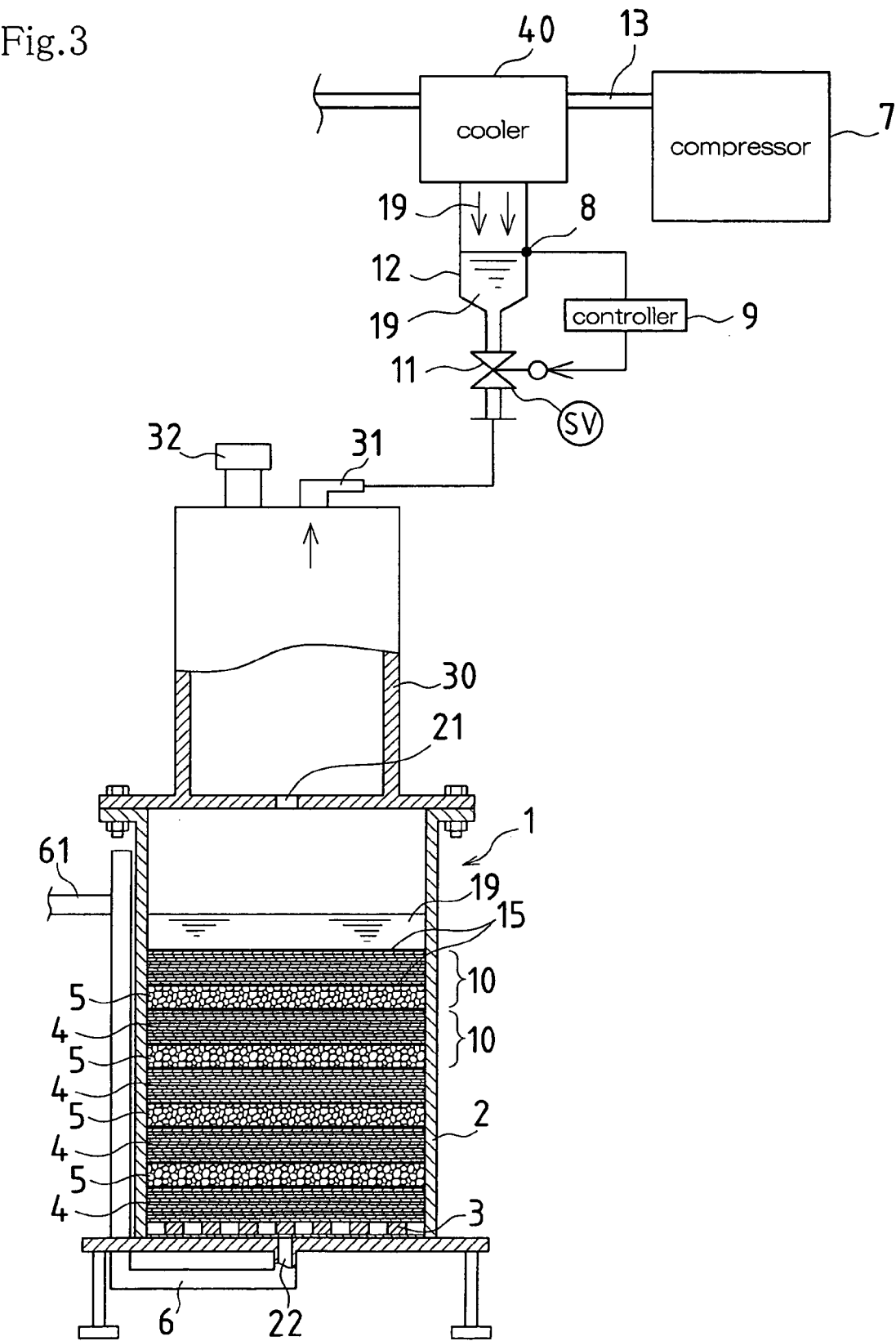
FIG. 3 is a diagram illustrating an oil separation system featuring the oil/water separation apparatus in the first embodiment of the present invention.

An oil separation system featuring the oil/water separation apparatus 1 equipped with the oil separation layer 10 structured as above will now be described through reference to FIG. 3.

This system is designed so that a drain waste liquid 19 (the oil-containing mixture) from a compressor 7 goes through a duct 13 and falls into a drain trap 12, which is a device for automatically discharging the drain waste liquid. A cooler 40 is connected between the duct 13 and the drain trap 12, so that hot air is cooled and the drifting oil mist and water bond together to become the drain waste liquid.

The drain waste liquid 19 is automatically supplied from this drain trap 12 to the oil/water separation apparatus 1. As a constitution for performing this supply operation, the drain trap 12 includes a level sensor 8 for detecting the height of the liquid surface, and a controller 9 for controlling the opening and closing of a solenoid valve 11 according to the output of the level sensor 8. With this constitution, when the level sensor 8 detects that the liquid level has reached a specific height, the controller 9 opens the solenoid valve 11. How long this solenoid valve 11 remains open can be preset with a timer or the like and thereby suitably controlled. In addition to an electronic discharge mechanism such as this, it is also possible to employ a mechanical automatic discharge mechanism.

The drain waste liquid 19 thus flows from the drain trap 12, through the inflow pipe 31, and into the buffer tank 30, and air flows along with the drain waste liquid 19 during this process. Since the air is allowed to escape by the relief valve 32 here, the inside of the buffer tank 30 is under micropressure. The pressure inside the buffer tank 30 can be regulated by means of the cross sectional area of the air passage of the relief valve 32, or with a weight.

Figure 4A:
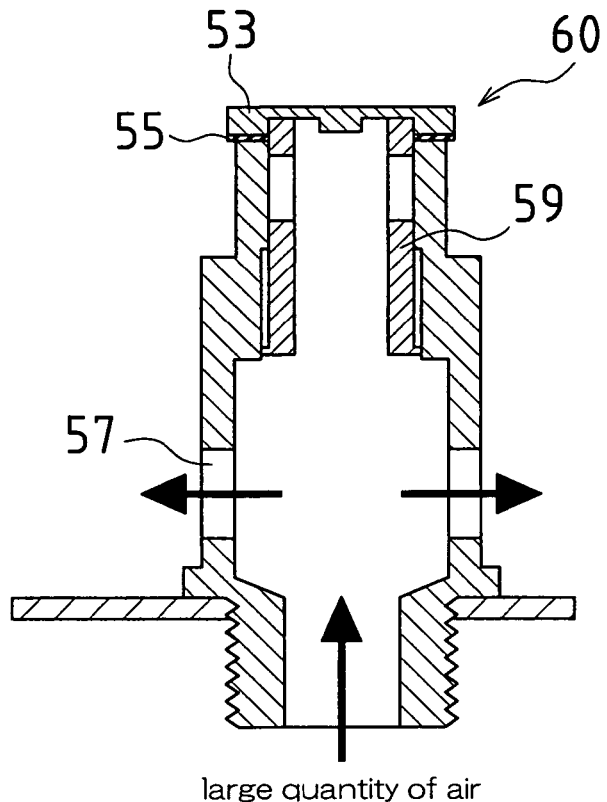
FIG. 4A is a diagram illustrating the structure of a relief valve applied to the oil/water separation apparatus in the first embodiment of the present invention.
Figure 4B:
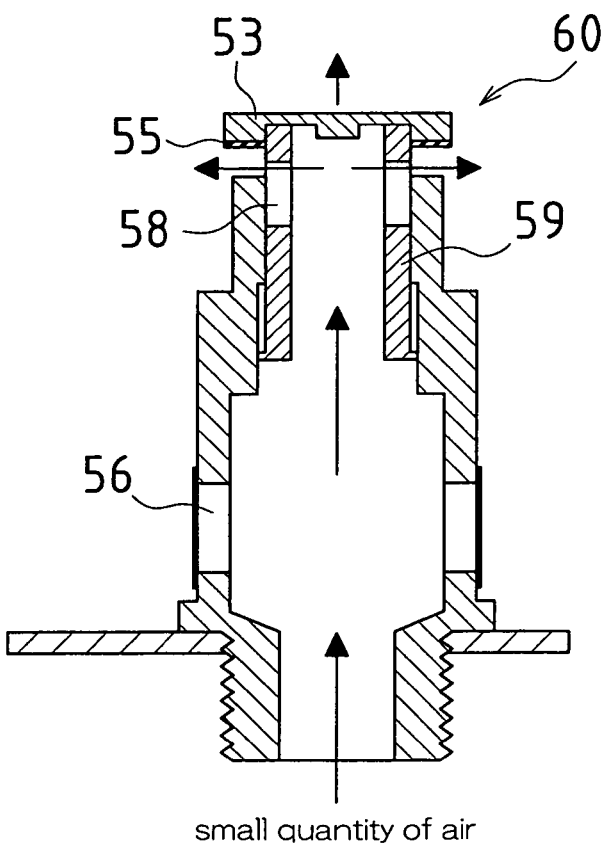
FIG. 4B is a diagram illustrating the structure of another relief valve that can be applied to the oil/water separation apparatus in the first embodiment of the present invention.

These relief valve will be described in further detail through reference to FIGS. 4A and 4B.

The relief valve is used to allow air to escape as it enters along with the drain waste liquid during the introduction of the drain waste liquid. The system is designed so that micropressure will be simultaneously applied inside the treatment vessel, keeping oil clogging to a minimum and allowing drain treatment to be carried out stably over a longer period. Specifically, when the drain trap, which is a device for automatically discharging the drain waste liquid, is disk type or electronic timer type of drain trap, a large quantity of air will be entrained by the drain waste liquid, so as shown in FIG. 4A, an air bleed hole 57 is provided so that the air will be released to the atmosphere through this hole 57. Most of the air escapes through the air bleed hole 57 here, but some of it remains in the treatment vessel, producing micropressure. Meanwhile, the quantity of air is smaller with a float type of drain trap, so no micropressure is produced in the treatment vessel with a structure involving the air bleed hole 57. Therefore, with the structure shown in FIG. 4B, the air bleed hole 57 is blocked off by tape 56, and an integral weight 60 that slides up and down (comprising a lid-like weight 53 that is integrated with a slide weight 59; a flat piece of rubber 55 is provided to the underside of the lid-like weight 53, and when the integral weight 60 is mounted, it fits snugly on top of the drain trap via this flat piece of rubber 55) is pushed up slightly, forming an air bleed hole 58, and the system is opened to the atmosphere through this air bleed hole 58. The weight is lifted here by just a small amount of air, and micropressure is produced by this lifting force.

Chips (not shown) composed of polypropylene nonwoven cloth are added to the specific space between the inlet port and the uppermost surface of the oil separation layer in order to adsorb floating oil. These chips can be the scraps from the sheets 4a produced in the step of cutting the sheets into circular shape during the manufacture of these sheets, allowing the raw material to be fully utilized without waste.

Thus, the drain waste liquid 19 flows into the oil separation layer in a state in which a certain amount of the floating oil has been removed in the specific space between the inlet port and the uppermost surface of the oil separation layer. This drain waste liquid 19 flows through the oil adsorbent layers 4 and the packed layers 5 in that order. In the course of this flow, fine colloidal oil is effectively removed by being coagulated into coarse particles and adsorbed into the coagulant 15. As a result, oil can be removed from an oil-containing mixture, and the drain waste liquid from a compressor can be purified, at a high level of precision that meets the requirements of the Water Pollution Prevention Law and environmental standards.

As described above, a salient feature of an embodiment of the present invention is that the oil-containing mixture flowing into the treatment vessel is under micropressure. A performance comparison was conducted by conducting an experiment to find what the oil concentration of treated water was and how long it took clogging to occur, both when micropressure was and was not applied, with the oil concentration in a drain waste liquid set at 300 ppm and the running time of a compressor set at 10 hours per day. These results are given in Table 1.

As shown in Table 1, the oil concentration of the treated water was 1 to 2 ppm when no micropressure was applied, but was just 0.1 to 0.3 ppm when micropressure was applied, meaning that the concentration was lower under micropressure. This confirmed that applying micropressure lowers the concentration to well below the 5 ppm required by environmental standards.

Furthermore, when no micropressure was applied, it took just 5 to 7 months for clogging to occur, whereas it took 1.5 to 2 years under micropressure. This confirmed that durability is better and service life is longer when micropressure is applied, than with a conventional apparatus in which no micropressure is applied.

TABLE 1

|  | No micropressure applied | Micropressure applied |
| --- | --- | --- |
| Oil concentration in treated water | 1 to 2 ppm | 0.1 to 0.3 ppm |
| Service life of treatment vessel | 5 to 7 months | 1.5 to 2 years |

With this embodiment, the oil adsorbent layers 4 were flat organic macromolecular sheets made of polypropylene, but are not limited to this, and may instead be mesh sheets made of inorganic fiber or organic macromolecular sheets that are lipophilic and hydrophobic, and they may be made of polyethylene, polyester, cotton, rayon, or glass wool. Also, there were ten of the sheets 4a here, but the number is not limited to this, and there may be anywhere between five and 15 sheets.

Also, the coagulant was aluminum hydroxide here, but is not limited to this, and may instead by ferric hydroxide.

An electrolyte obtained by electrolysis using an aluminum sheet, iron sheet, or the like as an electrode in water or weak saltwater can be used as an inorganic gelling agent. When an aluminum sheet is used as the electrode, this electrolyte will contain a hydroxide of eluted aluminum. The aluminum hydroxide in the electrolyte is observed as a white gel-like precipitate. When an iron sheet is used as the electrode, the electrolyte will contain a hydroxide of eluted iron. The ferric hydroxide in the electrolyte is observed as a brown gel-like precipitate. Also, aluminum hydroxide (an insoluble gel-like precipitate) can be precipitated by neutralizing an aluminum sulfate aqueous solution or an aluminum polychloride aqueous solution with sodium hydroxide or another such alkali, and this solution can be used as an inorganic gelling agent. Further, ferric hydroxide (an insoluble gel-like precipitate) can be precipitated by neutralizing a ferric sulfate aqueous solution or a ferric polychloride aqueous solution with sodium hydroxide or another such alkali, and this solution can be used as an inorganic gelling agent.

An organic macromolecular type of coagulant can be used supplementarily in this case, examples of which include acrylamide polymers, polymers of sodium acrylate and acrylamide, polymers of a dimethylaminoethyl acrylate methyl chloride quaternary salt and acrylamide, and polymers of a dimethylaminoethyl acrylate methyl chloride quaternary salt, acrylic acid, and acrylamide.

Further, the powder was activated carbon above, but is not limited to this, and may instead be zeolite, diatomaceous earth, activated clay, anthracite, bentonite, alumina, activated alumina, sand, vinyl chloride, polypropylene, or polyethylene.

In this embodiment, the treatment vessel was a one-stage type provided with a single vessel, but a two-stage type in which two vessels are provided may be used if needed.

Figure 5:
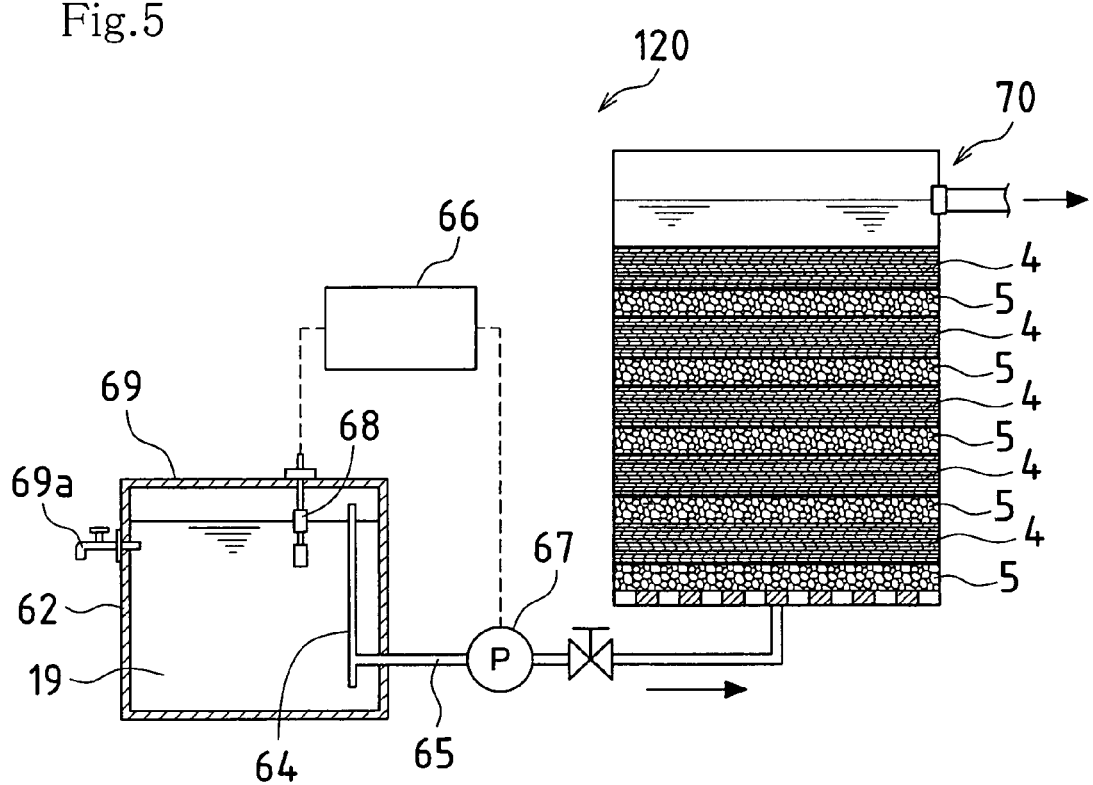
FIG. 5 is a diagram illustrating another oil separation system featuring the oil/water separation apparatus in the first embodiment of the present invention.

A system in which the drain waste liquid was allowed to fall naturally was described in the above embodiment, but the present invention is not limited to this, and can also be applied to a system in which the drain waste liquid is pumped in from below. An example of such a system is shown in FIG. 5. No buffer tank is required in this case. This pumping can be accomplished using a tube pump or an air-driven pump with which the pumping rate can be adjusted to about 50 to 300 mL/minute.

The oil/water separation apparatus 120 used with the system shown in FIG. 5 comprises an oil/water separation apparatus 70 and a specific gravity separation apparatus 69 connected by a connector pipe 65. The specific gravity separation apparatus 69 is equipped with a reservoir treatment vessel 62 having a take-off port 69a on a side face. A drain waste liquid 19 is held inside the reservoir treatment vessel 62. When the content goes over a certain amount, a sensor 68 moves up and actuates a controller 66. When the operating signal of the controller 66 reaches a pump 67, the drive of this pump 67 causes the drain waste liquid 19 to flow out through a discharge pipe 64 and into the oil/water separation apparatus 70 via the connector pipe 65. This oil/water separation apparatus 70 differs from the apparatus shown in FIG. 1 in that it has no buffer tank, as mentioned above, and that the layer provided over the slats is a packed layer 5. With this structure, although not shown, a fine mesh (barrier) that prevents the leakage of particles is interposed between the slats and the packed layer 5.

Figure 6:
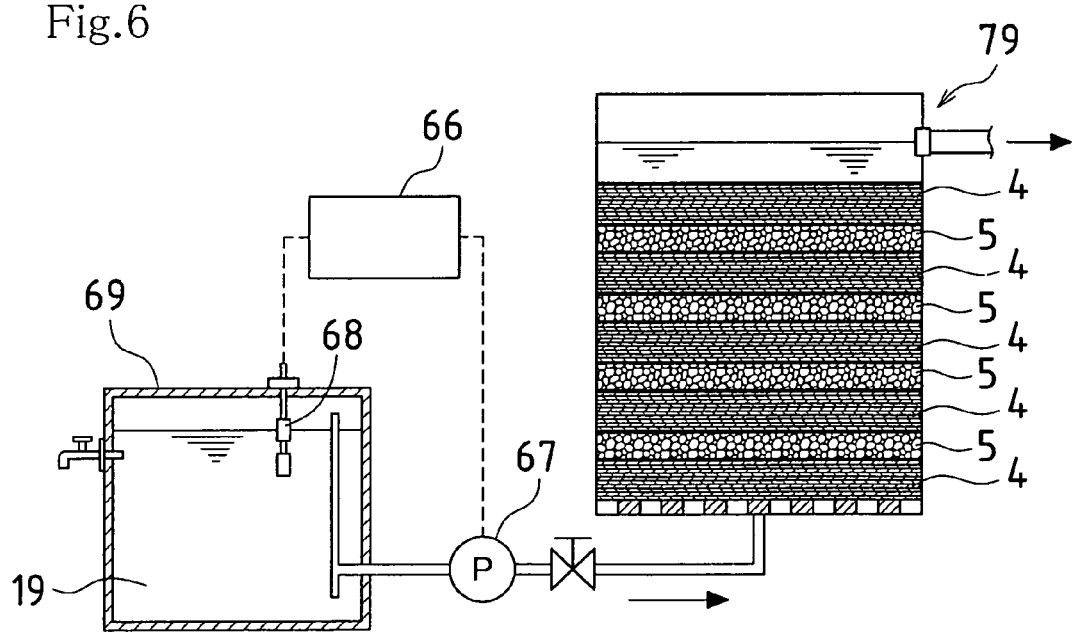
FIG. 6 is a diagram illustrating another oil separation system featuring a modification of the oil/water separation apparatus in the first embodiment of the present invention.

Also, with this system, an oil/water separation apparatus 79 that has the same laminar structure as shown in FIG. 1 can be applied as shown in FIG. 6.

Figure 7:
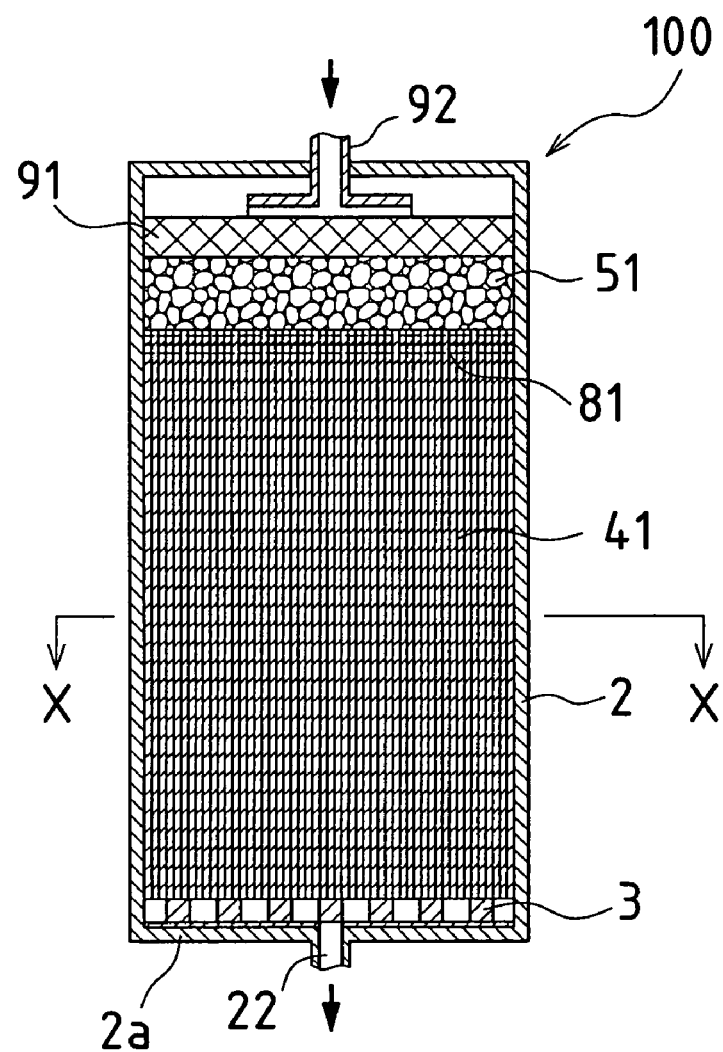
FIG. 7 is a vertical cross section of the main components in a second embodiment of the oil/water separation apparatus of the present invention.
Figure 8A:
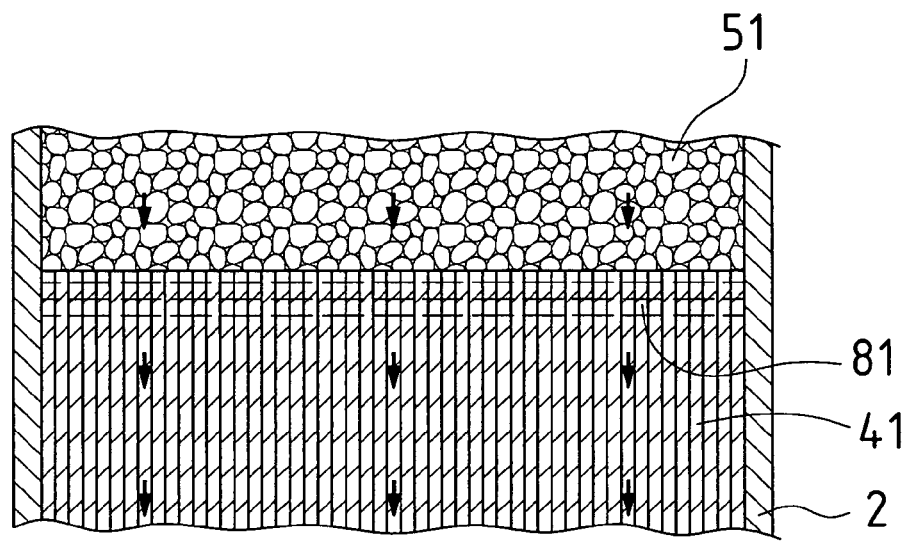
FIG. 8A is a vertical cross section of the oil separation layer in the second embodiment of the present invention.

Next, a second embodiment of the present invention will be described through reference to the drawings. FIG. 7 is a vertical cross section of the main components in this second embodiment of the oil/water separation apparatus of the present invention. FIG. 8A is a vertical cross section of the oil separation layer in the second embodiment of the present invention, and FIG. 8B is a cross section along the X-X line in FIG. 7.

An oil/water separation apparatus 100 shown in FIG. 7 is provided with the slatted sheet 3 over the bottom 2a on the inside of the treatment vessel 2, and an oil adsorbent layer 41 and a packed layer 51 are alternately laminated over this slatted sheet 3.

Figure 8B:
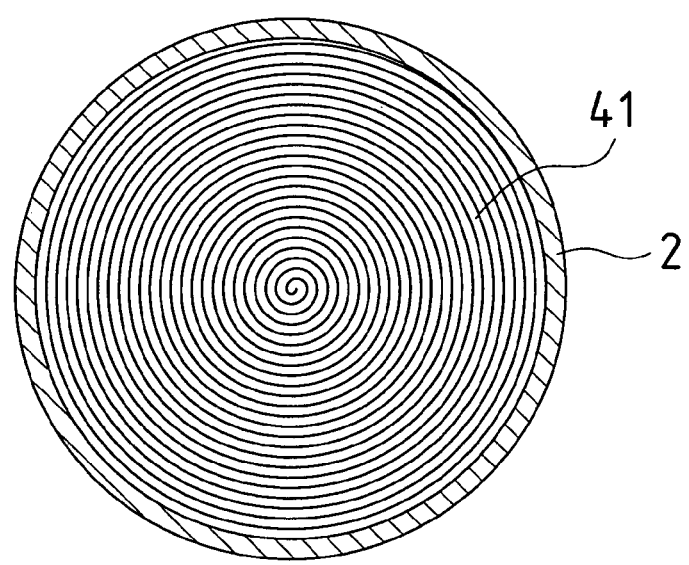
FIG. 8B is a cross section along the X-X line in FIG. 7.

As shown in FIG. 8B, the oil adsorbent layer 41 is an oil adsorbent material made of a nonwoven cloth of polypropylene or the like with a specific thickness and wound in a roll, in which the axis is the height direction. Meanwhile, the packed layer 51 is an integrated material in which a coagulant adheres to the surface of a powder. Part of the coagulant packed in the packed layer 51 forms a coagulant layer 81 by penetrating into the top layer of the oil adsorbent layer 41. An inorganic gelling agent such as ferric hydroxide or aluminum hydroxide adheres as a coagulant in the middle of the packed layer 51 and to the surface of the oil adsorbent layer 41.

A liquid permeable plate 91 is further provided over the top of the packed layer 51, and an inlet port 92 communicates with the top part of the liquid permeable plate 91. The inlet port of the treatment vessel 2 is formed by the protruding end of the inlet port 92. An outlet port 22 is provided to the bottom 2a of the treatment vessel 2, opposite the inlet port 92.

With the oil/water separation apparatus 100, the oil-containing mixture that enters under pressure through the inlet port 92 is first dispersed through the liquid permeable plate 91 while flowing into the treatment vessel 2. An air bleed hole is made in the top end of the vessel in case any high-pressure air should be admixed in the oil-containing mixture at this point. As shown in FIG. 8A, this oil-containing mixture flows uniformly into the interior of the packed layer 51. In the packed layer 51, the oil-containing mixture flows through the coagulant between the powder particles, and then passes beyond the coagulant layer 81 and reaches the oil adsorbent layer 41. The fine colloidal oil particles coagulate into coarse particles in the coagulant, allowing them to be more effectively adsorbed and removed in the oil adsorbent material vessel. As a result, oil can be removed from an oil-containing mixture at a high level of precision that meets the requirements of the Water Pollution Prevention Law and environmental standards.

With the oil/water separation apparatus 100, the intent was for the oil-containing mixture to fall from the inlet port 92 located above into the treatment vessel 2, but the present invention also encompasses a constitution in which the intent is for oily water to flow up into the treatment vessel 2 from a location below. In the latter case, the oil adsorbent layer 41 and the packed layer 51 are laminated in the opposite order from that in the constitution shown in FIG. 7. Also, the oil-containing mixture can be introduced under pressure rather than letting it fall in naturally. Introduction under pressure allows the oil of the oil-containing mixture to be separated as a stream.

Figure 9:
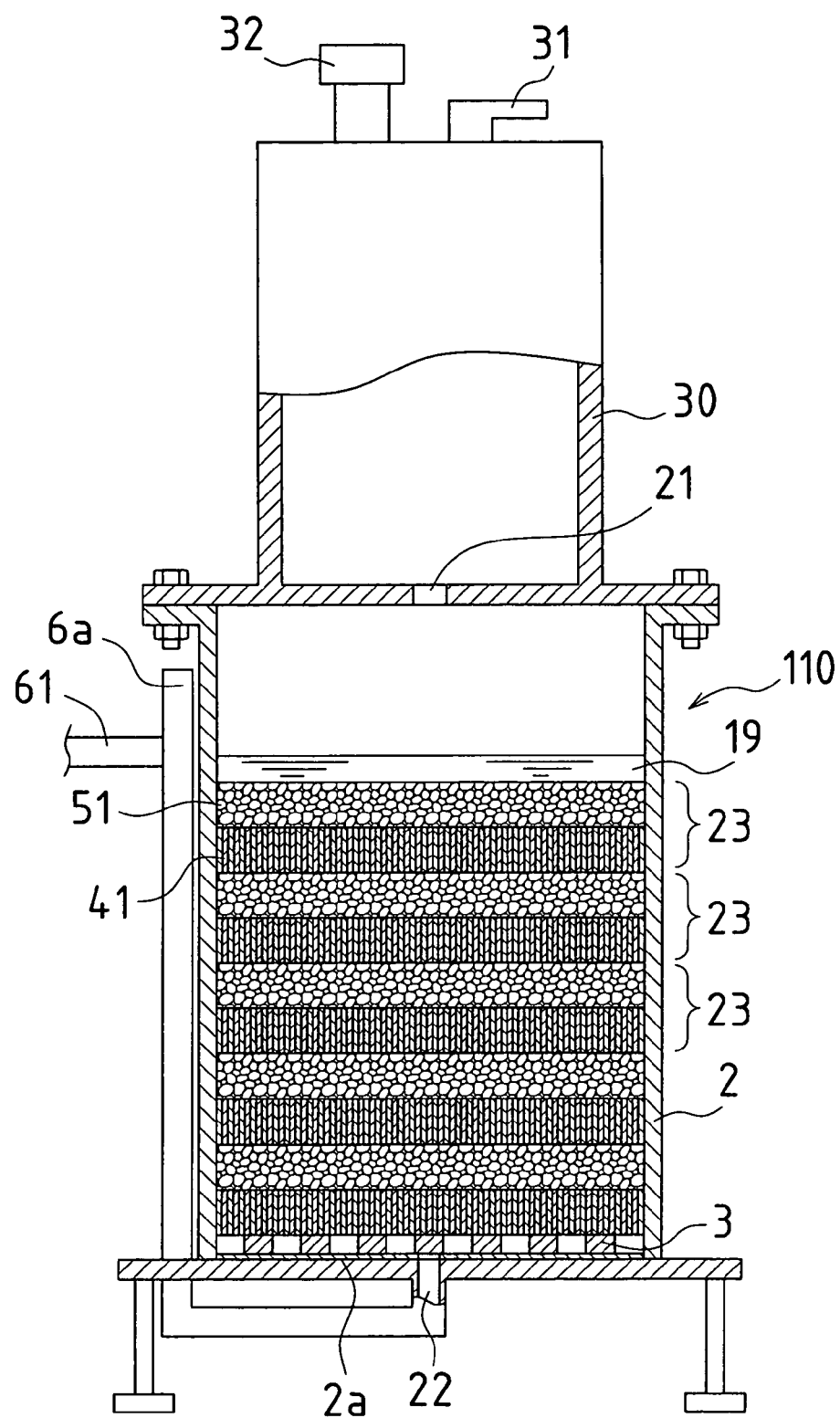
FIG. 9 is a vertical cross section of the main components in a third embodiment of the oil/water separation apparatus of the present invention.

An oil/water separation apparatus 110 of a third embodiment is shown in FIG. 9. The structure of this oil/water separation apparatus 110 is such that the structure shown in FIG. 7, that is, an oil separation layer 23 produced by laminating one oil adsorbent layer 41 and one packed layer 51, is laminated in a plurality of layers. The only difference from the structure shown in FIG. 1 is the constitution of the oil adsorbent layer, and the rest of the constitution is the same. The components that are the same as in the structure described above are numbered the same and will not be described again.

With this oil/water separation apparatus 110, the drain waste liquid 19 flows in through the inlet port 21, and is held for a specific length of time in the upper part of the treatment vessel 2. After this, the liquid falls naturally through the oil adsorbent layers 23, one after the other, and eventually flows out of the outlet port 22 provided to the bottom 2a via the slatted sheet 3.

With the oil/water separation apparatus 110, the oil-containing mixture that flows into the treatment vessel 2 repeatedly has its oil separated in the various oil separation layers 23. Because the oil is thus repeatedly separated from the drain waste liquid 19 by the oil separation layers 23, it can be separated at a higher level of precision. Another advantage to the oil/water separation apparatus 110 is that the apparatus can be made more compact.

Figure 10:
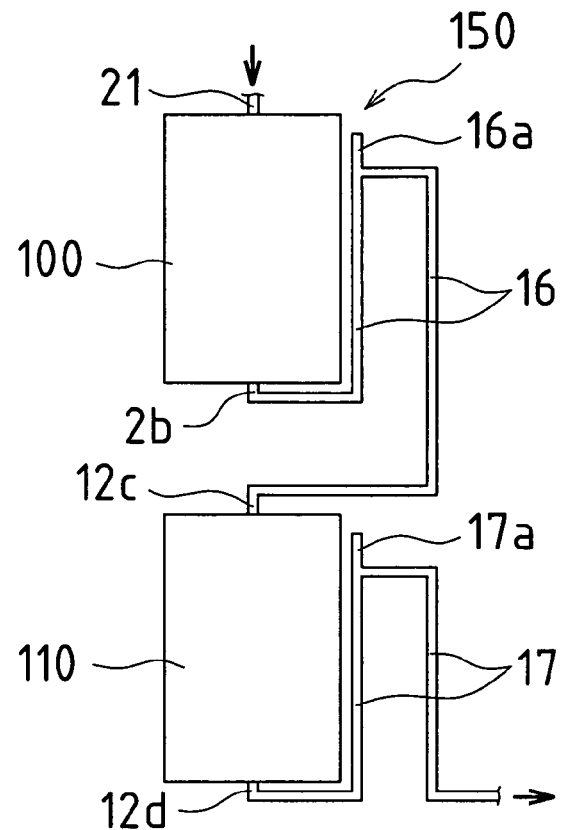
FIG. 10 is a diagram illustrating the constitution of a fourth embodiment of the present invention.

FIG. 10 shows the constitution of a fourth embodiment of the present invention. The oil/water separation apparatus 150 of this embodiment is constituted such that the oil/water separation apparatus 100 and the oil/water separation apparatus 110 described above are combined in series. That is, the oil/water separation apparatus 150 shown in the drawing is such that the outlet port 2b of the oil/water separation apparatus 100 communicates with the inlet port 12c of the oil/water separation apparatus 110 through a communicating pipe 16, and a discharge pipe 17 is provided to the outlet port 12d of the oil/water separation apparatus 110. The purpose of first having the communicating pipe 16 and the discharge pipe 17 rise upward is to allow the oil-containing mixture to flow evenly throughout the vessel, and to ensure liquid permeability by having the oil adsorbent layers immersed in the oil-containing mixture at all times. 16a and 17a are air bleed holes that serve to prevent siphoning.

With the oil/water separation apparatus 150, the oil in the oil-containing mixture introduced under pressure from the inlet port 21 to the oil/water separation apparatus 100 can be subjected to primary treatment as discussed above. The liquid that has undergone this primary treatment goes through the communicating pipe 16 and flows continuously into the oil/water separation apparatus 110.

Thus, with the oil/water separation apparatus 150, oil is continuously separated from the oil-containing mixture in the oil/water separation apparatus 100 and the oil/water separation apparatus 110, so fine oil in the oil-containing mixture, that is, colloidal oil, can also be separated and removed at a high level of precision.

Figure 11:
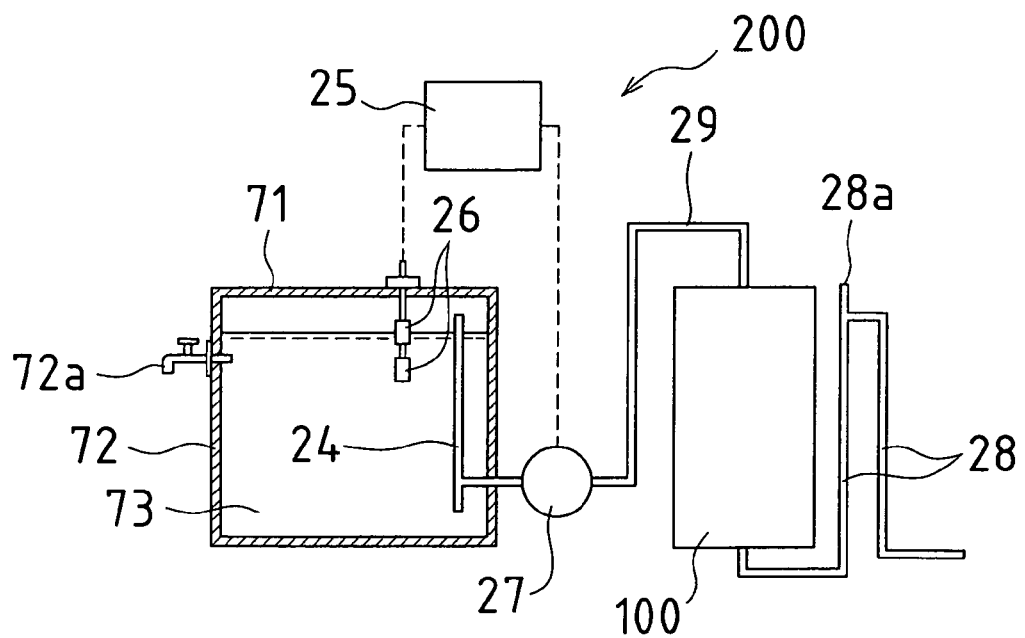
FIG. 11 is a diagram illustrating the constitution of a fifth embodiment of the present invention.

FIG. 11 shows the constitution of a fifth embodiment of the oil/water separation apparatus of the present invention. The oil/water separation apparatus 200 in this embodiment includes a specific gravity separation apparatus 71 connected by a connector pipe 29, which serves as a pretreatment for the oil/water separation apparatus 100. The specific gravity separation apparatus 71 is equipped with a reservoir treatment vessel 72 having a take-off port 72a on a side face. An oil-containing mixture 73 is held inside the reservoir treatment vessel 72. When the content goes over a certain amount, a sensor 26 moves up and actuates a controller 25. When the operating signal of the controller 25 reaches a pump 27, the drive of this pump 27 causes the oil-containing mixture 73 to flow out under pressure through a discharge pipe 24 and into the oil/water separation apparatus 100 via a connector pipe 29.

With the oil/water separation apparatus 200, any oil floating on water due to the difference in specific gravity between oil and water is removed from the oil-containing mixture 73 through the take-off port 72a. Since the oil/water separation apparatus 100 handles an oil-containing mixture that has already been pretreated, the incoming oil-containing mixture flows through more easily, allowing the oil separation treatment to be carried out faster and more efficiently. The treated liquid flows out through a discharge pipe 28, and is then either discharged directly or recycled. 28a is an air bleed hole.

Figure 12:
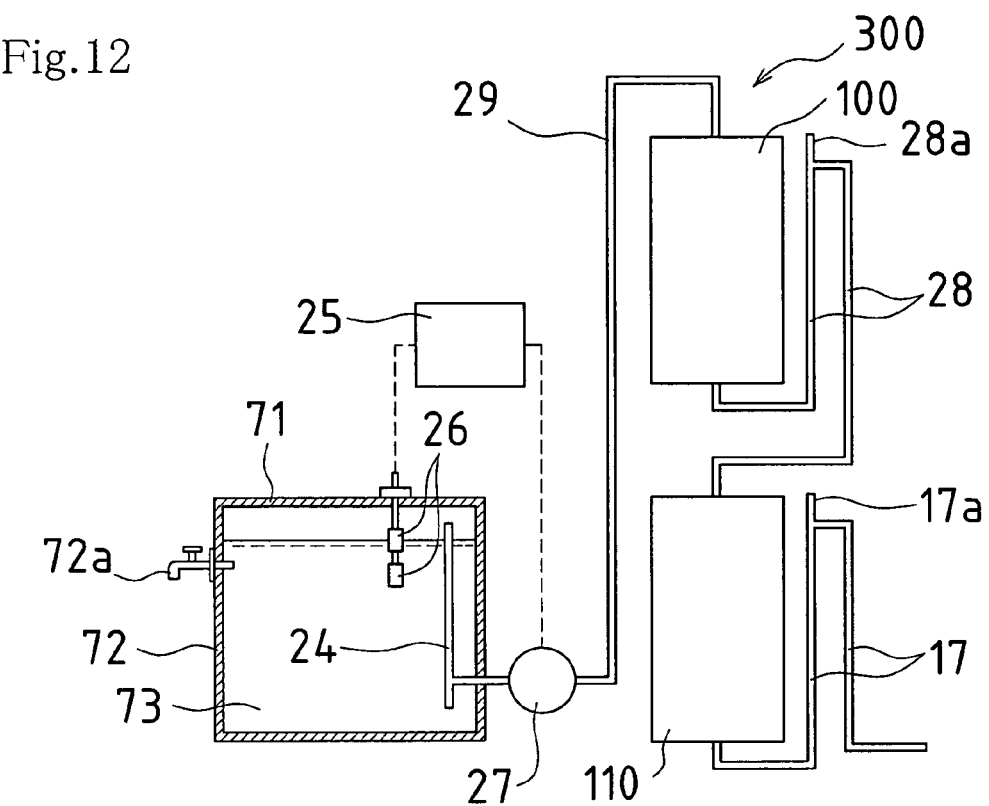
FIG. 12 is a diagram illustrating the constitution of a sixth embodiment of the present invention.

FIG. 12 shows the constitution of a sixth embodiment of the oil/water separation apparatus of the present invention. The oil/water separation apparatus 300 in this embodiment further links the oil/water separation apparatus 110 after the oil/water separation apparatus 100 in the oil/water separation apparatus 200 shown in FIG. 11.

With the oil/water separation apparatus 300, fine oil in the primary treated liquid can be repeatedly removed by the oil/water separation apparatus 110, so the oil separation treatment can be carried efficiently and at a high level of precision, and treatment performance can be maintained over an extended period.

Figure 13:
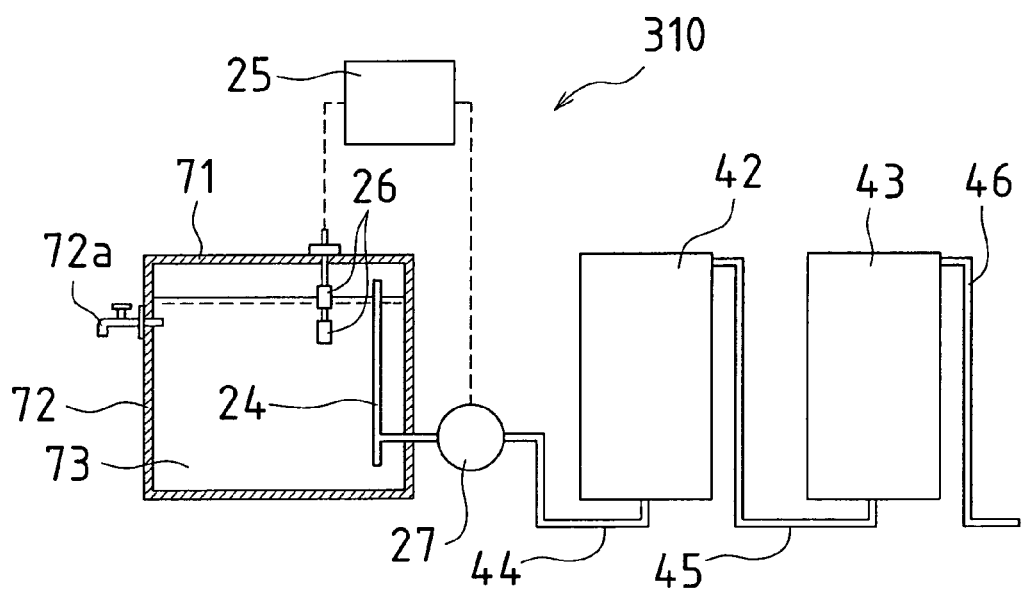
FIG. 13 is a diagram illustrating the constitution of a seventh embodiment of the present invention.

FIG. 13 shows the constitution of a seventh embodiment of the oil/water separation apparatus of the present invention. The oil/water separation apparatus 310 of this embodiment comprises the specific gravity separation apparatus 71, an oil/water separation apparatus 42, and an oil/water separation apparatus 43 connected in series. The oil/water separation apparatus 42 is such that the constitution of the oil separation layer of the oil/water separation apparatus 100 is reversed vertically, and the oil/water separation apparatus 43 is such that the constitution of the oily water separation layer of the oil/water separation apparatus 110 is reversed vertically. 44 and 45 are connector pipes, and 46 is a discharge pipe.

The oil/water separation apparatus 310 is designed so that the oil-containing mixture 73 flows in from the bottom of the oil/water separation apparatus 42 and the oil/water separation apparatus 43, and the pretreated oil-containing mixture can be subjected to oil separation treatment in the oil/water separation apparatus 42 and the oil/water separation apparatus 43.

Since the oil-containing mixture flows in from the lower part of the oil/water separation apparatus 42 and the oil/water separation apparatus 43, the oil-containing mixture can flow evenly through the oil separation layers in the oil/water separation apparatus 42 and the oil/water separation apparatus 43. As a result, the oil-containing mixture can be subjected to oil separation treatment more effectively, and the treatment performance can be maintained over an extended period.

Examples of the present invention will now be described.

EXAMPLE 1

As shown in FIG. 1, a slatted sheet (made of polyethylene, with a thickness of 15 mm) was provided over the bottom on the inside of a stainless steel vessel (26 cm in diameter, 40 cm tall), over which an oil separation layer (4 cm) and a packed layer were laminated in that order. These layers were alternately laminated in this same order, creating five oil adsorbent layers and four packed layers, with the uppermost layer being an oil adsorbent layer. Chips of polypropylene fiber for adsorbing floating oil were then randomly inserted over this uppermost layer. This constituted the oil/water separation apparatus of Example 1.

Oil Adsorbent Layers

The surfaces of flat sheets of polypropylene fiber (26 mm in diameter, 4 mm thick) that had undergone a hydrophilic treatment and had water-permeable pores of 1 to 100 μm were evenly coated with gelled aluminum hydroxide (coagulant) by passing an 1.5 L of electrolyte containing insoluble aluminum hydroxide through each sheet, and ten of these sheets were laminated while being coated, producing a thickness of 40 mm.

Packed Layers

5 L of electrolyte containing insoluble aluminum hydroxide was added to 500 g of activated carbon (the powder) with a particle size of 0.3 to 1 mm, which integrated the powder and created a layer with a thickness of 20 mm. This insoluble aluminum hydroxide remained in gel form between the powder particles, while the water in the electrolyte passed through and was discharged.

Coagulant

30×30 cm aluminum sheets (serving as electrodes) were immersed in 0.1% saltwater, and electrolysis was performed under stirring for 10 minutes at an electrode spacing of 1 cm and a current density of 3 Adm, producing an electrolyte containing aluminum hydroxide in the form of an insoluble, white, gelled precipitate through reaction between the aluminum ions from the anode and the hydroxy ions from the cathode. This electrolyte was used.

EXAMPLE 2

As shown in FIG. 7, a slatted sheet (made of polyethylene, with a thickness of 15 mm) was provided over the bottom on the inside of a synthetic resin vessel (20 L capacity, 30 cm φ×39 cm), over which an oil separation layer (25 cm thick) and a packed layer (7 cm thick) were laminated. A liquid-permeable plate was then disposed over the surface of the packed layer, and this product was termed the oil/water separation apparatus of Example 2.

Oil Adsorbent Layers

A mat made of polypropylene fiber and having water-permeable pores of 1 to 100 μm, which had undergone a hydrophilic treatment, was wound in a roll having a thickness of 25 cm.

Packed Layers

10 L of electrolyte containing aluminum hydroxide was added to 2.2 Kg of activated carbon (the powder) with a particle size of 0.3 to 1 mm φ, which integrated the powder and created a layer with a thickness of 7.3 cm. The aluminum hydroxide here remained in gel form between the powder particles, while the water in the electrolyte passed through and was discharged. The added aluminum hydroxide was also made by permeate all the way to the upper surface layer of the oil adsorbent material vessel, forming a coagulant layer of aluminum hydroxide with a thickness of 1 cm.

Coagulant

30×30 cm aluminum sheets (serving as electrodes) were immersed in 0.1% saltwater, and electrolysis was performed under stirring for 10 minutes at an electrode spacing of 1 cm and a current density of 3 Adm, producing an electrolyte containing aluminum hydroxide in the form of an insoluble, white, gelled precipitate through reaction between the aluminum ions from the anode and the hydroxy ions from the cathode. This electrolyte was used.

Liquid-Permeable Plate

This was a mat made of polypropylene fiber, having water-permeable pores of 10 to 100 μm, and having a thickness of 2 cm.

EXAMPLE 3

As shown in FIG. 9, five oil separation layers, each composed of an oil adsorbent layer and a packed layer, were laminated in the same vessel as in Example 2, and this product was used as the oil/water separation apparatus of Example 3. The materials were the same as in Example 2, but the thickness of the oil adsorbent layers was changed to 3 cm, and the thickness of the packed layers to 2 cm. The coagulant treatment was carried out in the same manner as in Example 2 for every layer. A coagulant layer with a thickness of 1 cm was provided over the top surface of the oil separation layers.

EXAMPLE 4

The oil/water separation apparatuses of Examples 2 and 3 were linked by linking pipe as shown in FIG. 10, and this product was termed the oil/water separation apparatus of Example 4.

COMPARATIVE EXAMPLE 1

Adsorption Treatment Type

A slatted sheet (made of polyethylene, with a thickness of 15 mm) was provided over the bottom on the inside of a synthetic resin vessel (20 L capacity, 30 cm φ×39 cm), over which an oil separation layer (25 cm thick) made of the same material as in Example 2 was laminated. Over this was deposited an activated carbon powder layer (7 cm thick) with a particle size of 0.3 to 1 mm φ. This product was termed the oil/water separation apparatus of Comparative Example 1.

COMPARATIVE EXAMPLE 2

Specific Gravity Separation Type, Adsorption Type

A take-off port for floating oil was provided to the side of a vessel (50 cm wide, 50 cm long, 80 cm tall, 160 L capacity), so that any oil floating on the water could be removed through this take-off port. The liquid from which this oil had been removed was then allowed to flow through an oil adsorbent material of the same material as in Example 2. This product was termed the oil/water separation apparatus of Comparative Example 2.

Compressor drain wastewater (oil content of 432 ppm) was introduced into each of the oil/water separation apparatuses of Examples 1 to 4 and Comparative Examples 1 and 2, either under pressure or by natural fall, at a treatment rate of 10 L/hour. The treated water was collected from the final outlet port of each vessel, and the oil content was measured by normal hexane extract weight method (JIS K 0102-24.1, 2), the results of which are given in Table 2. With the specific gravity separation apparatus of Comparative Example 2, the residence time in the reservoir was 16 hours.

TABLE 2

| Oil/water separation apparatus | | Oil content in oil-containing mixture (ppm) | Oil content in treated liquid after oil separation (ppm) | Treatment rate (L/hour) |
|---|---|---|---|---|
| Example | 1 | 432 | 0.2 | 10 |
|  | 2 | 432 | 2.0 | 10 |
|  | 3 | 432 | 1.0 | 10 |
|  | 4 | 432 | 1.0 | 10 |
| Comparative | 1 | 432 | 18.7 | 10 |
| Example | 2 | 432 | 6.5 | 10 |

The oil-containing mixture used in these examples was in a heavily emulsified state, and maintained this state even after standing for a week.

It can be seen from the results given in Table 1 that with the oil/water separation apparatuses of Examples 1 to 4, the oil contained in compressor drain wastewater could be eliminated faster and at higher precision than with the apparatuses of Comparative Examples 1 and 2.

As shown above, with the oil/water separation apparatus of this embodiment, the powder is integrated by a coagulant to form a packed layer, after which an oil-containing mixture is made to flow quickly through the coagulant in between the powder particles, so that colloidal oil can be absorbed, condensed, and made into coarse particles. In the oil adsorbent layer, the oil is coagulated into coarse particles in the packed layers and coagulant layer, and the oil contained in the liquid that has undergone this primary treatment is eventually adsorbed and separated very effectively.

This coagulant layer is formed between a packed layer and an oil adsorbent layer, and if any colloidal oil flows through this coagulant layer and thereby escapes being made into coarse particles, it will effectively be made into coarse particles in this surface layer portion, allowing such oil to be completely adsorbed away in the oil separation layer. Because fine colloidal oil is thus effectively coagulated and made into coarse particles in the packed layers and coagulant layer, oil can be completely adsorbed, separated, and removed in the oil adsorbent layer. The capacity of the oil adsorbent layer to adsorb and hold oil was approximately 10 L in Example 1, so if the oil concentration in the oil-containing mixture is 432 ppm, for instance, it will be possible to treat 23,000 L of oil-containing mixture, and in the case of a compressor drain, this means that a good oil separation effect can be maintained over an extended period of time.

When two or more of the oil separation layers composed of an oil adsorbent layer and a packed layer in the above apparatus are laminated to create an oil/water separation apparatus, the above-mentioned oil separation operation in the oil separation layer can be performed over and over. Therefore, oil separation can be accomplished more effectively, and the apparatus will take up less installation space. Furthermore, when each oil separation layer is formed very thin, the liquid can flow through the layers faster, allowing the overall treatment time to be shortened, meaning that treatment can be carried out more quickly.

With an oil/water separation apparatus in which two or more apparatuses are linked with an apparatus having just one oil separation layer as above, the system can be installed in a smaller space, and the effect described above will be synergistic.

Also, when a specific gravity separation apparatus is used for pretreatment, the oily water separation performance and durability of the above oil/water separation apparatus will be even better, and treatment can be performed more quickly.

What is claimed is:

1. An apparatus for separating oil from an oil-containing mixture, comprising a treatment vessel in which an inlet port for an oil-containing mixture and an outlet port for treated water produced by oil separation treatment are provided across from one another, wherein an interior of the treatment vessel is provided with an oil separation layer produced by alternately laminating oil adsorbent layers, which fit snugly against the inner walls of the treatment vessel, and packed layers, in which spaces between powder particles in the packed layers are filled with a coagulant, and a specific space is maintained within the treatment vessel between the inlet port and an uppermost surface of said oil separation layer.

2. The apparatus for separating oil from an oil-containing mixture according to claim 1, wherein the oil adsorbent layers are produced by the lamination of a plurality of flat sheets.

3. The apparatus for separating oil from an oil-containing mixture according to claim 2, wherein the oil adsorbent layers also comprise a coagulant which adheres evenly over the surface of every one of the plurality of flat sheets, or at intervals of every few sheets.

4. The apparatus for separating oil from an oil-containing mixture according to claim 2, wherein the coagulant is gelled aluminum hydroxide or ferric hydroxide.

5. The apparatus for separating oil from an oil-containing mixture according to claim 2, wherein a communicating pipe is connected to the outlet port of the treatment vessel, said communicating pipe is provided in a height direction of the treatment vessel, and a treated water take-off port that opens outward is provided at a location corresponding to a specific height within the specific space in the treatment vessel.

6. The apparatus for separating oil from an oil-containing mixture according to claim 2, wherein a buffer tank is provided directly above the treatment vessel, and air pressure inside the buffer tank is adjusted with a pressure relief valve so that the inside of said buffer tank will be under micropressure.

7. The apparatus for separating oil from an oil-containing mixture according to claim 6, wherein chips that adsorb floating oil are added to the specific space, and these chips are composed of nonwoven cloth.

8. The apparatus for separating oil from an oil-containing mixture according to claim 2, wherein the flat sheets are mesh sheets made of inorganic fiber, or are organic macromolecular sheets that are lipophilic and hydrophobic.

9. The apparatus for separating oil from an oil-containing mixture according to claim 8, wherein the flat sheets are made of one selected from the group consisting of polypropylene, polyethylene, polyester, cotton, rayon, and glass wool.

10. The apparatus for separating oil from an oil-containing mixture according to claim 1, wherein the powder is composed of one selected from the group consisting of activated carbon, zeolite, diatomaceous earth, activated clay, anthracite, bentonite, alumina, activated alumina, sand, vinyl chloride, polypropylene, and polyethylene, and has a particle size of 0.1 to 3 mm.

11. The apparatus for separating oil from an oil-containing mixture according to claim 1, wherein a slatted sheet is provided between the outlet port of the treatment vessel and the oil separation layer.

12. The apparatus for separating oil from an oil-containing mixture according to claim 1, wherein the oil adsorbent layers are composed of nonwoven cloth and wound in a roll whose axis is parallel with a height direction of the treatment vessel.

13. The apparatus for separating oil from an oil-containing mixture according to claim 12, wherein the oil separation layer comprises a plurality of laminated oily water separation layers each produced by laminating first the oil adsorbent layer and then the packed layer inside the treatment vessel.

14. The apparatus for separating oil from an oil-containing mixture according to claim 12, wherein a layer composed of coagulant is provided to a top layer portion of the oil adsorbent layer.

15. The apparatus for separating oil from an oil-containing mixture according to claim 12, wherein the coagulant is gelled aluminum hydroxide or ferric hydroxide.

16. The apparatus for separating oil from an oil-containing mixture according to claim 12, wherein a communicating pipe is connected to the outlet port of the treatment vessel, said communicating pipe is provided in a height direction of the treatment vessel, and a treated water take-off port that opens outward is provided at a location corresponding to a specific height within the specific space in the treatment vessel.

17. The apparatus for separating oil from an oil-containing mixture according to claim 12, wherein a buffer tank is provided directly above the treatment vessel, and air pressure inside the buffer tank is adjusted with a pressure relief valve so that the inside of said buffer tank will be under micropressure.

18. The apparatus for separating oil from an oil-containing mixture according to claim 17, wherein chips that adsorb floating oil are added to the specific space, and these chips are composed of nonwoven cloth.

19. The apparatus for separating oil from an oil-containing mixture according to claim 12, wherein the nonwoven cloth is made of one material selected from the group consisting of polypropylene, polyethylene, polyester, cotton, rayon, and glass wool.

* * * * *